(12) United States Patent
Orlando et al.

(10) Patent No.: US 7,726,113 B2
(45) Date of Patent: Jun. 1, 2010

(54) GAS TURBINE ENGINE ASSEMBLY AND METHODS OF ASSEMBLING SAME

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 987 days.

(21) Appl. No.: 11/253,934

(22) Filed: Oct. 19, 2005

(65) Prior Publication Data

US 2007/0084186 A1    Apr. 19, 2007

(51) Int. Cl.
*F02C 1/06* (2006.01)
*F02C 3/10* (2006.01)

(52) U.S. Cl. ............ 60/39.162; 60/268; 60/226.1; 415/61; 416/128

(58) Field of Classification Search ......... 60/228, 60/226.1, 39.162; 415/9, 174.4; 416/2
See application file for complete search history.

(56) References Cited

U.S. PATENT DOCUMENTS

| | | | | |
|---|---|---|---|---|
| 3,729,957 A * | 5/1973 | Petrie et al. | .............. | 60/226.1 |
| 3,866,415 A * | 2/1975 | Ciokajlo | .............. | 60/226.1 |
| 4,005,575 A * | 2/1977 | Scott et al. | .............. | 60/226.1 |
| 4,080,785 A * | 3/1978 | Koff et al. | .............. | 60/226.3 |
| 4,251,987 A * | 2/1981 | Adamson | .............. | 60/805 |
| 4,340,320 A * | 7/1982 | Moss | .............. | 404/122 |
| 4,688,995 A * | 8/1987 | Wright et al. | .............. | 416/127 |
| 4,751,816 A * | 6/1988 | Perry | .............. | 60/226.1 |
| 4,790,133 A * | 12/1988 | Stuart | .............. | 60/226.1 |
| 4,827,712 A * | 5/1989 | Coplin | .............. | 60/226.1 |
| 5,010,729 A * | 4/1991 | Adamson et al. | .............. | 60/226.1 |
| 5,105,618 A * | 4/1992 | Lardellier | .............. | 60/226.1 |
| 5,274,999 A * | 1/1994 | Rohra et al. | .............. | 60/226.1 |
| 5,307,622 A * | 5/1994 | Ciokajlo et al. | .............. | 60/39.162 |
| 5,433,672 A * | 7/1995 | Tanaka et al. | .............. | 475/178 |
| 5,806,303 A | 9/1998 | Johnson | | |
| 5,809,772 A | 9/1998 | Giffin, III et al. | | |
| 5,813,214 A | 9/1998 | Moniz et al. | | |
| 5,867,980 A | 2/1999 | Bartos | | |
| 6,082,967 A * | 7/2000 | Loisy | .............. | 416/129 |
| 6,158,210 A * | 12/2000 | Orlando | .............. | 60/226.1 |
| 6,381,948 B1 * | 5/2002 | Klingels | .............. | 60/226.1 |
| 6,619,030 B1 | 9/2003 | Seda et al. | | |
| 6,622,473 B2 * | 9/2003 | Becquerelle et al. | .............. | 60/226.1 |
| 6,684,626 B1 | 2/2004 | Orlando et al. | | |
| 6,711,887 B2 | 3/2004 | Orlando et al. | | |
| 6,732,502 B2 | 5/2004 | Seda et al. | | |
| 6,739,120 B2 * | 5/2004 | Moniz et al. | .............. | 60/226.1 |
| 6,763,652 B2 | 7/2004 | Baughman et al. | | |
| 6,763,653 B2 | 7/2004 | Orlando et al. | | |
| 6,763,654 B2 | 7/2004 | Orlando et al. | | |
| 7,195,447 B2 * | 3/2007 | Moniz et al. | .............. | 415/69 |
| 7,296,398 B2 * | 11/2007 | Moniz et al. | .............. | 60/268 |
| 7,334,392 B2 * | 2/2008 | Moniz et al. | .............. | 60/204 |

(Continued)

*Primary Examiner*—William H Rodriguez
(74) *Attorney, Agent, or Firm*—William Scott Andes, Esq.; Armstrong Teasdale LLP

(57) ABSTRACT

A method for assembling a gas turbine engine includes coupling a low-pressure turbine to a core turbine engine, and coupling a counter-rotating fan assembly including a first fan assembly and a second fan assembly to the low-pressure turbine such that the first fan assembly rotates in a first direction and the second fan assembly rotates in an opposite second direction.

11 Claims, 3 Drawing Sheets

U.S. PATENT DOCUMENTS

| | | | |
|---|---|---|---|
| 2006/0090451 A1* | 5/2006 | Moniz et al. | 60/226.1 |
| 2007/0084184 A1* | 4/2007 | Orlando et al. | 60/204 |
| 2007/0084185 A1* | 4/2007 | Moniz et al. | 60/204 |
| 2007/0084186 A1* | 4/2007 | Orlando et al. | 60/204 |
| 2007/0084187 A1* | 4/2007 | Moniz et al. | 60/204 |
| 2007/0084188 A1* | 4/2007 | Orlando et al. | 60/204 |
| 2007/0084189 A1* | 4/2007 | Moniz et al. | 60/204 |
| 2007/0084190 A1* | 4/2007 | Moniz et al. | 60/204 |
| 2007/0240399 A1* | 10/2007 | Orlando et al. | 60/39.162 |
| 2008/0098716 A1* | 5/2008 | Orlando et al. | 60/226.1 |

* cited by examiner

GAS TURBINE ENGINE ASSEMBLY AND METHODS OF ASSEMBLING SAME

BACKGROUND OF THE INVENTION

This invention relates generally to gas turbine engines, and more specifically to gas turbine engine assemblies and methods of assembling the same.

At least some known gas turbine engines include a forward fan, a core engine, and a power turbine. The core engine includes at least one compressor, a combustor, a high-pressure turbine, and a low-pressure turbine coupled together in a serial flow relationship. More specifically, the compressor and high-pressure turbine are coupled through a shaft to define a high-pressure rotor assembly. Air entering the core engine is then mixed with fuel and ignited to form a high energy gas stream. The gas stream flows through the high-pressure turbine, rotatably driving it, such that the shaft that, in turn, rotatably drives the compressor.

The gas stream expands as it flows through the low-pressure turbine. The low-pressure turbine rotatably drives the fan through a low-pressure shaft such that a low-pressure rotor assembly is defined by the fan, the low-pressure shaft, and the low-pressure turbine. To facilitate increasing engine efficiency, at least one known gas turbine engine includes a counter-rotating low-pressure turbine that is coupled to a counter-rotating fan and/or a counter-rotating booster compressor.

To assemble a gas turbine engine including a counter-rotating low-pressure turbine, an outer rotating spool, a rotating frame, a mid-turbine frame, and two concentric shafts, are installed within the gas turbine engine to facilitate supporting the counter-rotating turbine. The installation of the aforementioned components also enables a first fan assembly to be coupled to a first turbine and a second fan assembly to be coupled to a second turbine such that the first and second fan assemblies each rotate in the same rotational direction as the first and second turbines. Accordingly, the overall weight, design complexity, and/or manufacturing costs of such an engine are increased.

BRIEF DESCRIPTION OF THE FIGURES

In one aspect, a method for assembling a gas turbine engine is provided. The method includes coupling a low-pressure turbine to a core turbine engine, and coupling a counter-rotating fan assembly including a first fan assembly and a second fan assembly to the low-pressure turbine such that the first fan assembly rotates in a first direction and the second fan assembly rotates in an opposite second direction.

In another aspect, a counter-rotating fan assembly is provided. The counter-rotating fan assembly includes a first fan assembly coupled to a low-pressure turbine, the first fan assembly comprising a disk and a plurality of rotor blades coupled to the disk and configured to rotate in a first rotational direction, and a second fan assembly coupled to the low-pressure turbine, the second fan assembly comprising a disk and a plurality of rotor blades coupled to the disk, the second fan assembly configured to rotate in a second rotational direction.

In a further aspect, a turbine engine assembly is provide. The turbine engine assembly includes a core turbine engine, a low-pressure turbine coupled to the core turbine engine, and a counter-rotating fan assembly coupled to the low-pressure turbine, the counter-rotating fan assembly comprising a first fan assembly coupled to the low-pressure turbine and configured to rotate in the first direction and a second fan assembly coupled to the low-pressure turbine, the second fan assembly configured to rotate in an opposite second direction.

BRIEF DESCRIPTION OF THE DRAWINGS

Figure 1:
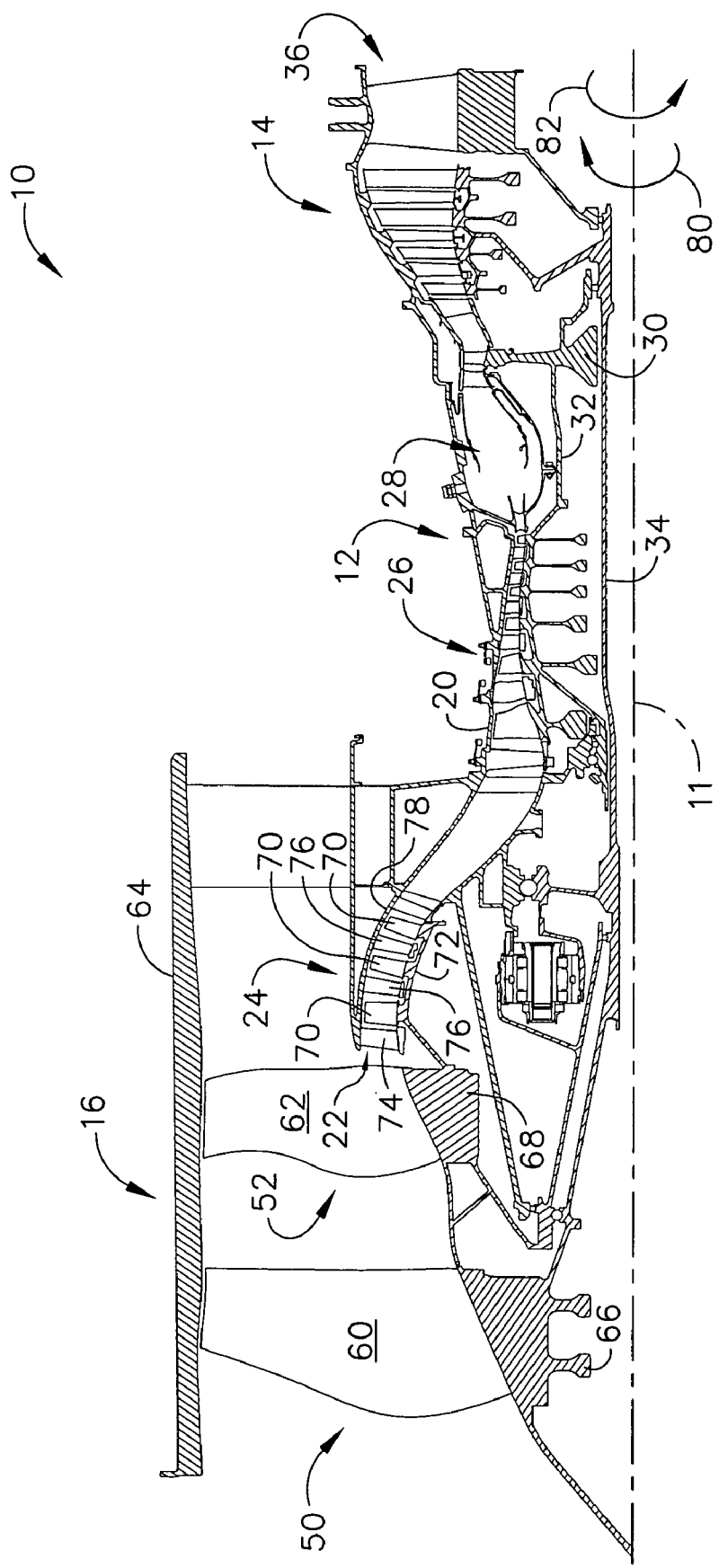
Figure 2:
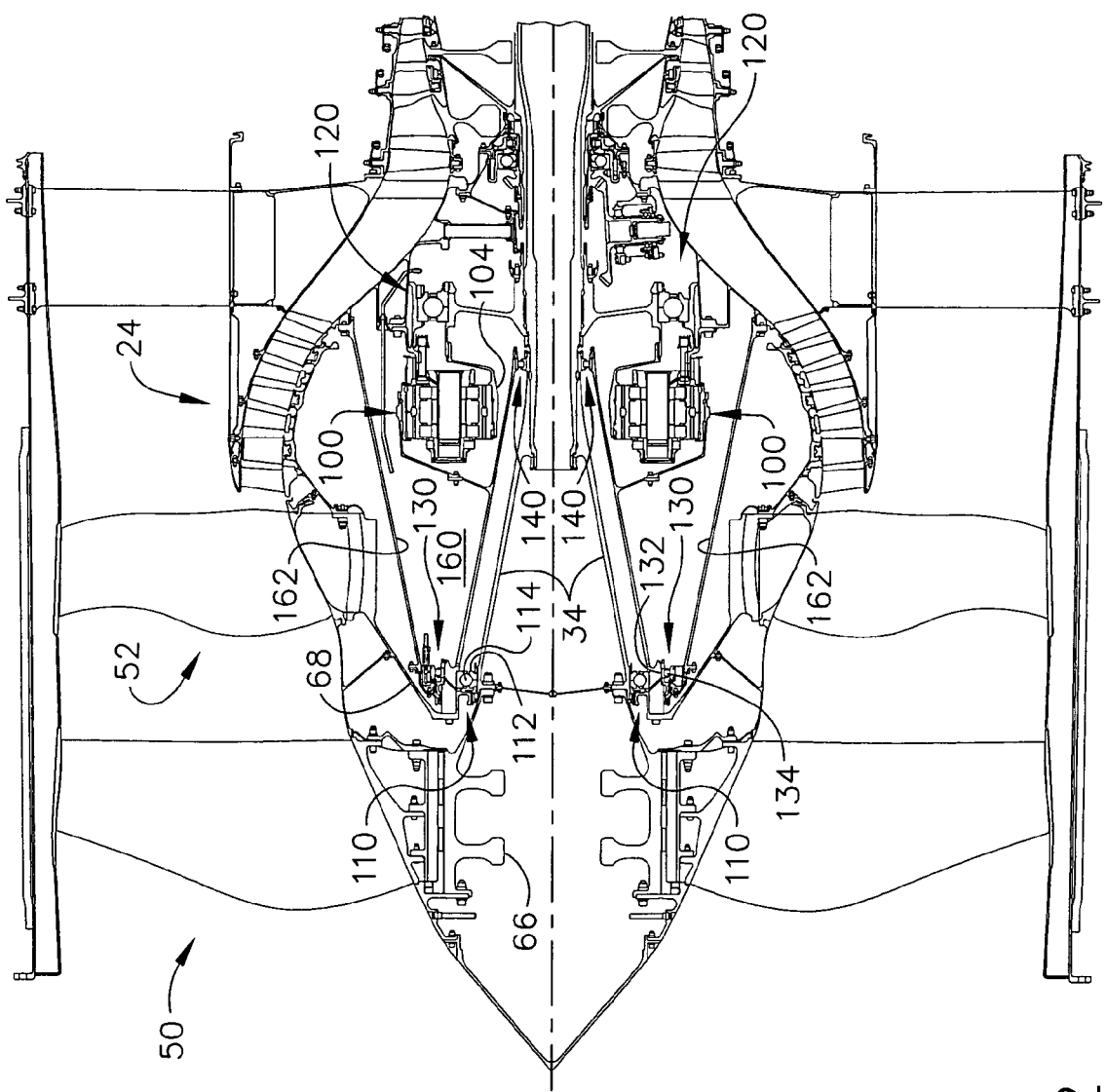
Figure 3:
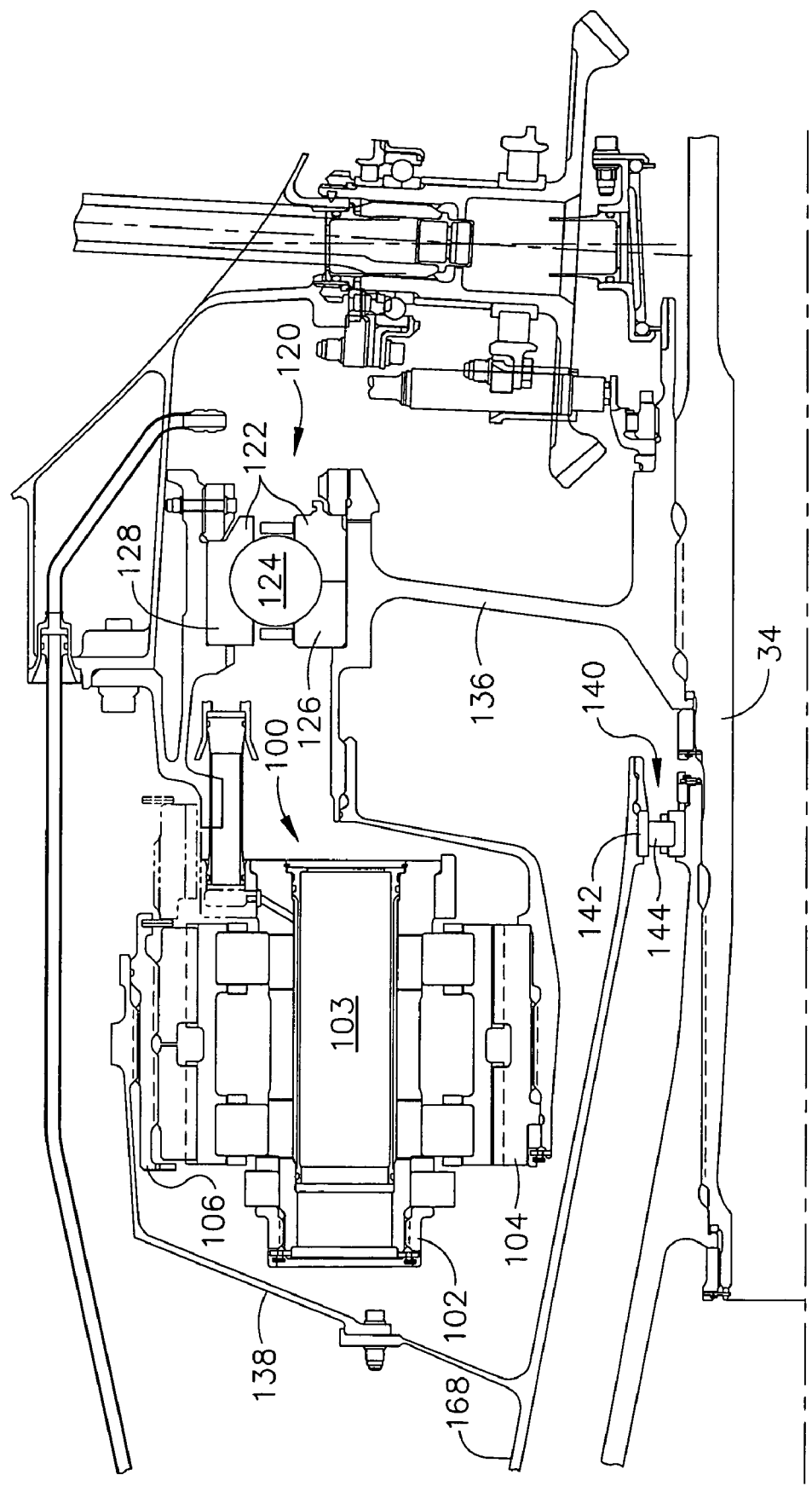

FIG. 1 is a cross-sectional view of a portion of an exemplary turbine engine assembly;

FIG. 2 is an enlarged cross-sectional view of a portion of the counter-rotating fan assembly shown in FIG. 1; and FIG. 3 is an enlarged cross-sectional view of a portion of the counter-rotating fan assembly shown in FIG. 2.

DETAILED DESCRIPTION OF THE INVENTION

FIG. 1 is a cross-sectional view of a portion of an exemplary turbine engine assembly 10 having a longitudinal axis 11. In the exemplary embodiment, turbine engine assembly 10 includes a core gas turbine engine 12, a low-pressure turbine 14 that is coupled axially aft of core gas turbine engine 12, and a counter-rotating fan assembly 16 that is coupled axially forward of core gas turbine engine 12.

Core gas turbine engine 12 includes an outer casing 20 that defines an annular core engine inlet 22. Casing 20 surrounds a low-pressure booster compressor 24 to facilitate increasing the pressure of the incoming air to a first pressure level. In one embodiment, gas turbine engine 12 is a core CFM56 gas turbine engine available from General Electric Aircraft Engines, Cincinnati, Ohio.

A high-pressure, multi-stage, axial-flow compressor 26 receives pressurized air from booster compressor 24 and further increases the pressure of the air to a second, higher pressure level. The high-pressure air is channeled to a combustor 28 and is mixed with fuel. The fuel-air mixture is ignited to raise the temperature and energy level of the pressurized air. The high energy combustion products flow to a first or high-pressure turbine 30 for driving compressor 26 through a first drive shaft 32, and then to second or low-pressure turbine 14 to facilitate driving counter-rotating fan assembly 16 and booster compressor 24 through a second drive shaft 34 that is coupled coaxially with first drive shaft 32. After driving low-pressure turbine 14, the combustion products leave turbine engine assembly 10 through an exhaust nozzle 36 to provide propulsive jet thrust.

Counter-rotating fan assembly 16 includes a forward fan assembly 50 and an aft fan assembly 52 disposed about longitudinal centerline axis 11. The terms "forward fan" and "aft fan" are used herein to indicate that fan assembly 50 is coupled axially upstream from fan assembly 52. In the exemplary embodiment, fan assemblies 50 and 52 are positioned at a forward end of core gas turbine engine 12 as illustrated. In an alternative embodiment, fan assemblies 50 and 52 are each positioned at an aft end of core gas turbine engine 12. Fan assemblies 50 and 52 each include at least one row of rotor blades 60 and 62, respectively, and are each positioned within a nacelle 64. Blades 60 and 62 are coupled to respective rotor disks 66 and 68.

In the exemplary embodiment, booster compressor 24 includes a plurality of rows of rotor blades 70 that are coupled to a respective rotor disk 72. In the exemplary embodiment, booster compressor 24 is positioned aft of an inlet guide vane assembly 74 and is coupled to aft fan assembly 52 such that booster compressor 24 rotates at a rotational speed that is substantially equal to a rotational speed of aft fan assembly 52. Although booster compressor 24 is shown as having only three rows of rotor blades 70, it should be realized that booster compressor 24 may have a single row of rotor blades 70, or a plurality of rows of rotor blades 70 that are interdigitated with a plurality of rows of guide vanes 76. In one embodiment, inlet guide vanes 76 are fixedly coupled to a booster case 78. In another embodiment, rotor blades 70 are rotatably coupled to rotor disk 72 such that inlet guide vanes 76 are movable during engine operation to facilitate varying a quantity of air channeled through booster compressor 24. In an alternative embodiment, turbine engine assembly 10 does not include booster compressor 24.

In the exemplary embodiment, low-pressure turbine 14 is coupled to forward fan assembly 50 through shaft 34 such that low-pressure turbine 14 and forward fan assembly 50 rotate in a first rotational direction 80, and aft fan assembly 52 is coupled to low-pressure turbine 14 such that aft fan assembly 52 rotates in an opposite second direction 82.

FIG. 2 is a schematic diagram of a portion of counter-rotating fan assembly 16 shown in FIG. 1. FIG. 3 is a schematic diagram of a portion of the counter-rotating fan assembly 16 shown in FIG. 2. In the exemplary embodiment, counter-rotating fan assembly 16 also includes a gearbox 100 that is coupled between aft fan assembly 52 and second drive shaft 34 to facilitate rotating aft fan assembly 52 in a second opposite direction 82 than forward fan assembly 50.

In the exemplary embodiment, gearbox assembly 100 has a gear ratio of approximately 2 to 1 such that forward fan assembly 50 rotates at a rotational speed that is approximately twice the rotational speed of aft fan assembly 52. In another embodiment, forward fan assembly 50 rotates with a rotational speed that is between approximately 0.9 and 2.1 times faster than the rotational speed of aft fan assembly 52. In another embodiment, forward fan assembly 50 rotates at a rotational speed that is approximately 1.5 times faster than the rotational speed of aft fan assembly 52. In a further embodiment, forward fan assembly 50 rotates at a rotational speed that is approximately 0.67 times the rotational speed of aft fan assembly 52. Accordingly, in the exemplary embodiment, forward fan assembly 50 rotates at a rotational speed that is faster than the rotational speed of aft fan assembly 52. In an alternative embodiment, forward fan assembly 50 rotates at a rotational speed that is slower than the rotational speed of aft fan assembly 52. In the exemplary embodiment, gearbox 100 is a radial gearbox that substantially circumscribes shaft 34 and includes a support structure 102, at least one gear 103 coupled within support structure 102, an input 104, and an output 106.

In the exemplary embodiment, turbine engine assembly 10 also includes a first fan bearing assembly 110, a second fan bearing assembly 120, a third fan bearing assembly 130, and a fourth fan bearing assembly 140. First fan bearing assembly 110 includes a bearing race 112 and a rolling element 114 coupled within bearing race 112. Aft fan bearing assembly 120 includes a bearing race 122 and a rolling element 124 coupled within bearing race 122. In the exemplary embodiment, fan bearing assemblies 110 and 120 are each thrust bearings that facilitate maintaining forward fan assembly 50 and aft fan assembly 52, respectively, in a relatively fixed axial position. Third fan bearing assembly 130 includes a bearing race 132 and a rolling element 134 that is coupled within bearing race 132. Fourth fan bearing assembly 140 includes a bearing race 142 and a rolling element 144 that is coupled within bearing race 142. In the exemplary embodiment, fan bearing assemblies 130 and 140 are each roller bearings that facilitate providing rotational support to aft fan assembly 52 such that aft fan assembly 52 can rotate freely with respect to forward fan assembly 50. Accordingly, fan bearing assemblies 130 and 140 facilitate maintaining aft fan assembly 52 in a relatively fixed radial position within counter-rotating fan assembly 16.

In the exemplary embodiment, gearbox support structure 102 is coupled to a stationary component. More specifically, and in the exemplary embodiment, fan bearing assembly 120 includes a rotating inner race 126 and a stationary outer race 128 such that rolling element 124 is coupled between races 126 and 128, respectively. More specifically, in the exemplary embodiment, gearbox input 104 is rotatably coupled to second drive shaft 34 via a drive shaft extension 136 that is splined to drive shaft 34, and a gearbox output 106 is rotatably coupled to aft fan assembly 52 via an output structure 138. More specifically, a first end of output structure 138 is splined to gearbox output 106 and a second end of output structure 138 is coupled to drive shaft 168 to facilitate driving aft fan assembly 52. Outer race 128 facilitates maintaining assembly gearbox 100 in a substantially fixed position within turbine engine assembly 10.

During operation, as second drive shaft 34 rotates, second drive shaft 34 causes gearbox input 104 to rotate, which subsequently rotates gearbox output 106. Because bearing outer race 128 is coupled to aft fan assembly 52, second drive shaft 34 causes aft fan assembly 52 to rotate via gearbox 100 in an opposite second direction 82 than forward fan assembly 50. In the exemplary embodiment, gearbox 100 is located within a sump 160 defined between second fan drive shaft 168 and a structural support member 162 configured to support aft fan assembly 52. During operation, gearbox 100 is at least partially submerged within lubrication fluid contained in sump 160. As such, gearbox 100 is facilitated to be continuously lubricated during engine operation.

The gas turbine engine assembly described herein includes a counter-rotating (CR) fan assembly having a geared single rotation (SR) low-pressure turbine. The assembly facilitates reducing at least some of the complexities associated with known counter-rotating low-pressure turbines. More specifically, the gas turbine engine assembly described herein includes a front fan that is rotatably coupled to a single rotation low-pressure turbine, and an aft fan and booster assembly that are rotatably coupled together, and driven by, the low-pressure turbine via a gearbox. Moreover, the aft fan assembly and booster assembly are driven at the same speed, which, in the exemplary embodiment, is approximately one-half the front fan speed. Additionally, the gas turbine engine assembly described herein is configured such that approximately 40% of power generated by the low-pressure turbine is transmitted through the gearbox to the aft fan assembly to facilitate reducing gear losses. Therefore, in the event of a gearbox failure, i.e. the aft fan assembly ceases to rotate, the front fan assembly will continue to operate since it is directly driven by the low-pressure turbine.

As a result, the gas turbine engine assembly described herein facilitates increasing fan efficiency, reducing fan tip speed, and/or reducing noise. Moreover, since the gas turbine engine assembly described herein does not include a counter-rotating low-pressure turbine to drive the counter-rotating fan assemblies, various components such as, but not limited to, an outer rotating spool, a rotating rear frame, a second low-pressure turbine shaft, and a low-pressure turbine outer rotating seal are eliminated, thus reducing the overall weight of the gas turbine engine assembly. Moreover, in some gas turbine engine applications a mid turbine frame may be eliminated utilizing the methods and apparatuses described herein.

Exemplary embodiments of a gas turbine engine assembly that includes a gearbox coupled to a fan assembly are described above in detail. The components are not limited to the specific embodiments described herein, but rather, components of each system may be utilized independently and separately from other components described herein. The gearbox described herein can also be used in combination with other known gas turbine engines that include a forward and an aft fan assembly.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   providing a low-pressure turbine that rotates in a single direction; and
   coupling a counter-rotating fan assembly including a first fan assembly and a second fan assembly to the low-pressure turbine such that the first fan assembly is rotatable in a first direction and the second fan assembly is rotatable in a second direction that is opposite the first direction, wherein a single drive shaft is coupled between the low-pressure turbine and the first fan assembly, and wherein a gearbox is coupled between the single drive shaft and the second fan assembly such that the first fan assembly is rotatable in the first direction at a first rotational speed and the second fan assembly is rotatable in the second direction at a second rotational speed that is different than the first rotational speed.

2. A method in accordance with claim 1 further comprising positioning the second fan assembly axially aft of the first fan assembly.

3. A method in accordance with claim 1 wherein said coupling a counter-rotating fan assembly including a first fan assembly and a second fan assembly to the low-pressure turbine comprises coupling the first fan assembly and the second fan assembly to the low-pressure turbine such that the second rotational speed is approximately one-half of the first rotational speed.

4. A method in accordance with claim 1 further comprising coupling a booster compressor to the second fan assembly such that the booster compressor rotates at the second rotational speed.

5. A method in accordance with claim 1 further comprising positioning the gearbox within an engine sump.

6. A turbine engine assembly comprising:
   a low-pressure turbine that rotates in a single direction;
   a counter-rotating fan assembly coupled to said low-pressure turbine, said counter-rotating fan assembly comprising a first fan assembly configured to rotate in a first direction and a second fan assembly configured to rotate in a second direction that is opposite the first direction;
   a single drive shaft coupled between said low-pressure turbine and said first fan assembly; and
   a gearbox coupled between said shaft and said second fan assembly such that said first fan assembly is rotatable in the first direction at a first rotational speed and said second fan assembly is rotatable in the second direction at a second rotational speed that is different than the first rotational speed.

7. A turbine engine assembly in accordance with claim 6 wherein said second fan assembly is positioned axially aft of said first fan assembly.

8. A turbine engine assembly in accordance with claim 6 wherein said second fan assembly is configured to rotate at the second rotational speed such that the second rotational speed is approximately one-half of the first rotational speed.

9. A turbine engine assembly in accordance with claim 6 wherein said gearbox has a gear ratio that is approximately equal to 3.5 to 1 such that the second rotational speed is less than the first rotational speed.

10. A turbine engine assembly in accordance with claim 6 further comprising a booster compressor coupled to said second fan assembly such that said booster compressor is configured to rotate in the second direction and at the second rotational speed.

11. A turbine engine assembly in accordance with claim 6 wherein said gearbox is coupled within an engine sump.

\* \* \* \* \*